(12) United States Patent  (10) Patent No.: US 8,073,555 B2
Fuller  (45) Date of Patent: *Dec. 6, 2011

(54) BASEPOINT ESTIMATOR

(75) Inventor: James W. Fuller, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 608 days.

This patent is subject to a terminal disclaimer.

(21) Appl. No.: 12/115,570

(22) Filed: May 6, 2008

(65) Prior Publication Data

US 2009/0281640 A1  Nov. 12, 2009

(51) Int. Cl.
 *G05B 13/02*  (2006.01)
(52) U.S. Cl. ............... 700/31; 700/33; 700/34; 700/44; 703/2
(58) Field of Classification Search ............ 700/28–34, 700/38, 44–45, 52–53, 73–74; 701/11, 12, 701/38; 244/75.1–99.9; 702/185, 186; 703/2
See application file for complete search history.

(56) References Cited

U.S. PATENT DOCUMENTS

| 5,091,843 A | 2/1992 | Peckowski |
| 5,396,416 A | 3/1995 | Berkowitz |
| 5,479,897 A | 1/1996 | Kawai |
| 5,488,561 A | 1/1996 | Berkowitz |
| 5,704,011 A | 12/1997 | Hansen |
| 6,330,483 B1 | 12/2001 | Dailey |
| 6,882,889 B2 | 4/2005 | Fuller |
| 7,152,023 B2 | 12/2006 | Das |
| 7,203,554 B2 | 4/2007 | Fuller |
| 2004/0107012 A1 | 6/2004 | Das |

*Primary Examiner* — Dave Robertson
(74) *Attorney, Agent, or Firm* — Carlson, Gaskey & Olds, PC (57) ABSTRACT

A method of estimating a basepoint includes a plurality of goals, wherein each goal has a desired value, receiving a plurality of sensor feedback signals from a controlled system, and receiving a plurality of predicted output values of the controlled system from a mathematical model. A desired change for a plurality of basepoint values is estimated in response to the goals, the feedback, and the predicted ooutput values. An actual change in basepoint values is calculated in response to a plurality of limits and the desired change for the plurality of basepoint values. The desired change is modified as necessary to hold the limits. The actual change in basepoint values is combined with last pass values of the plurality of basepoint values to produce an updated basepoint estimate.

12 Claims, 5 Drawing Sheets

BASEPOINT ESTIMATOR

This invention was made with government support under Contract No.: N00019-02-C-3003 awarded by the Navy. The government may therefore have certain rights in this invention.

BACKGROUND OF THE INVENTION

This application relates to control systems, and more particularly to a method of estimating a basepoint in a multivariable control system.

In control theory, a given control system may have a plurality of goals and a plurality of limits. Limits are inequality constraints on system dynamic variables. An example limit may be to prevent an engine temperature from exceeding a certain temperature to prevent engine deterioration. An example goal may be to achieve a certain engine thrust level, such as a thrust of 10,000 pounds. While it is desirable to achieve goals, it is necessary to meet limits.

A multivariable system may include a number of effectors that can be adjusted to meet system goals and limits. In some cases, a system may be cross-coupled, which means that each effector change may affect goals and limits with varying dynamics. In a cross-coupled system, it may not be possible to change a single effector in isolation to affect a single goal or limit, as a change in one effector may affect a plurality of goals or limits. A basepoint is a set of system values corresponding to a state of equilibrium in which a rate of change for the system is zero, a predetermined amount of limits are met, and a quantity of goals are fulfilled.

SUMMARY OF THE INVENTION

A method of estimating a basepoint includes receiving a plurality of goals, wherein each goal has a desired value, receiving a plurality of sensor feedback signals from a controlled system, and receiving a plurality of predicted output values of the controlled system from a mathematical model. A desired change for a plurality of basepoint values is estimated in response to the goals, the feedback, and the predicted output values. An actual change in basepoint values is calculated in response to a plurality of limits and the desired change for the plurality of basepoint values. The desired change is modified as necessary to hold the limits. The actual change in basepoint values is combined with last pass values of the plurality of basepoint values to produce an updated basepoint estimate.

These and other features of the present invention can be best understood from the following specification and drawings, the following of which is a brief description.

DETAILED DESCRIPTION OF THE PREFERRED EMBODIMENT

Figure 1:
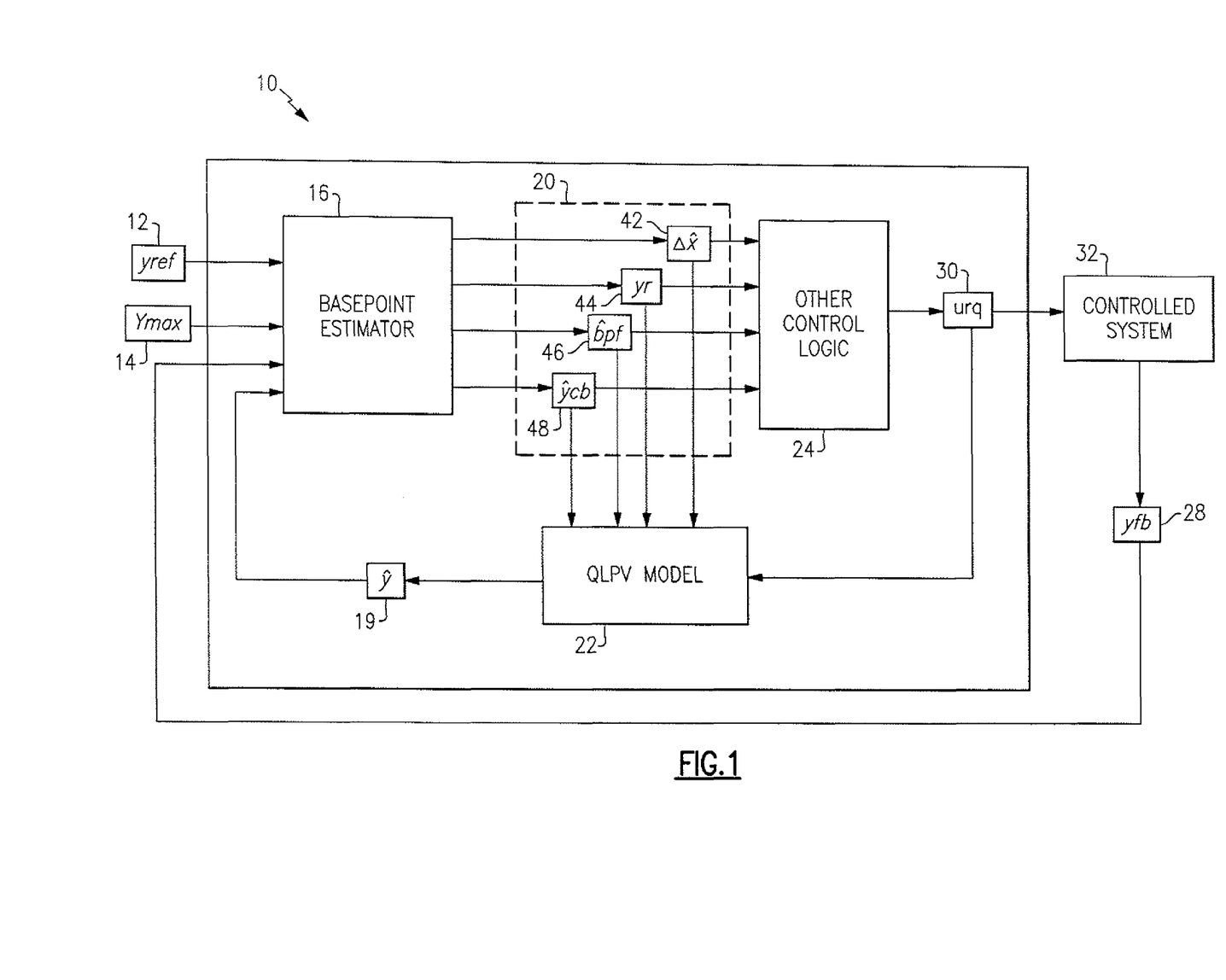
FIG. 1 schematically illustrates an example multivariable control system.

FIG. 1 schematically illustrates an example multivariable control system 10. The system 10 includes a basepoint estimator 16 operable to receive a plurality of goals 12 ("yref"), a plurality of maximum limits 14 ("ymax"), a feedback signal 28 ("yfb"), and a predicted output 19 ("ŷ") from a mathematical model 22, and to calculate a basepoint estimate 20 in response to the goals 12, limits 14, feedback signal 28, and model predictions 19. It is understood that the feedback signal 28 could include a plurality of feedback signals. The model predictions 19 correspond to predicted behavior of a controlled system 32. A basepoint is a set of values corresponding to an equilibrium point at which a rate of change of the controlled system 32 is zero, and at which a predetermined amount of limits 14 are met and a quantity of goals 12 are fulfilled according to a goal prioritization scheme.

One embodiment of a multivariable control system 10 is described in commonly-assigned, co-pending U.S. application Ser. No. 12/115,574, the disclosure of which is incorporated herein by reference.

The basepoint estimate 20 is transmitted to the mathematical model 22 and control logic 24. In one example the mathematical model 22 is a quasi-linear parameter varying ("QLPV") model. In one example the mathematical model 22 is a locally linearized model. The basepoint estimate 20 includes a change in an estimated state 42 ("$\Delta \hat{x}$") of the controlled system 32, internal reference values 44 ("yr"), free basepoint values 46 ("b̂pf") that do not have reference values, and basepoint values 48 ("ŷcb") associated with variables having limits. Throughout this application a carat ("$\hat{0}$") corresponds to an estimated value.

The control logic 24 receives the basepoint estimate 20 and produces actuator requests 34 ("urq"), which are transmitted to the controlled system 32 to effect change in the controlled system 32. In one example the controlled system 32 is a vehicle, such as an aircraft. However, it is understood that the multivariable control system 10 could be used to control other systems. The transmission of actuator requests 34 to the controlled system 32 may include transmitting the actuator requests 30 to actuators which control effectors that may be adjusted to control the controlled system 32. The feedback signal 28 is transmitted from the controlled system 32 back to the multivariable control system 10. The basepoint estimator 16, basepoint estimate 20, other control logic 24, actuator requests 30, QLPV model 22, and predicted output 19 ("ŷ") collectively form an estimator loop.

The mathematical model 22 may be based on equations #1-2, as shown below:

$$x_{n+1} = A(p)*(x_n - xb_n) + B(p)*(urq_n - ub_n) + xb_n \qquad \text{equation \#1}$$

$$y_n = C(p)*(x_n - xb_n) + D(p)*(urq_n - ub_n) + yb_{nn} \qquad \text{equation \#2}$$

where $xb_n$, $ub_n$, and $yb_{nn}$ are basepoint values;
x corresponds to a real state of the controlled system 32;
$y_n$ corresponds to outputs of the controlled system 32;
$urq_n$ corresponds to actuator requests,
p corresponds to parameters, and
A, B, C, and D are coefficients.

In the basepoint estimator 16, the collection of basepoints in the vectors xb, ub, and yb are regrouped into vectors yr, bpf, and ycb, where yr corresponds to basepoints for variables for which there are associated desired values (or "goals"), ycb corresponds to basepoints for variables for which there are limits, and bpf is a vector containing the remaining basepoints (or "free basepoints").

Figure 2:
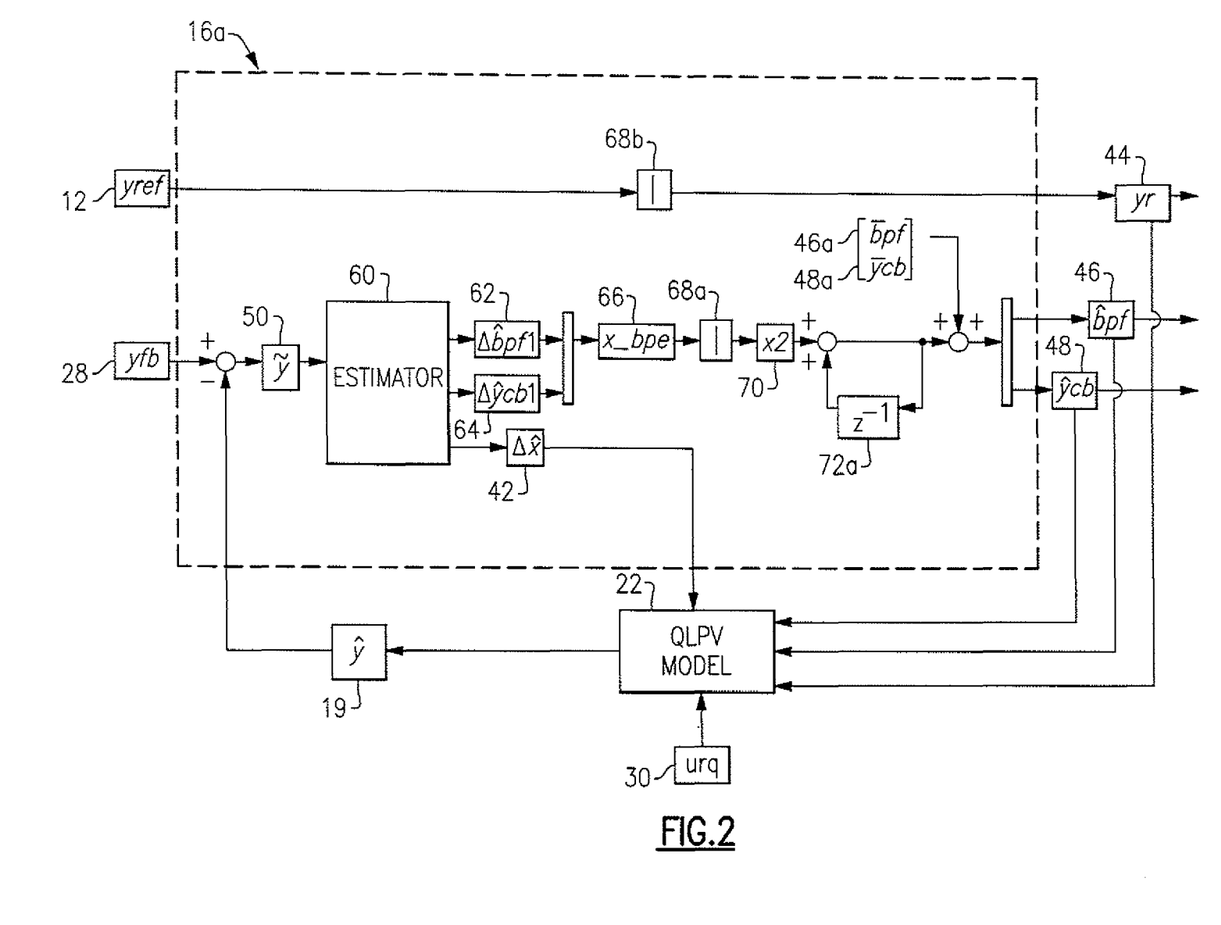
FIG. 2 schematically illustrates a basepoint estimator that could be used in the multivariable control system of FIG. 1.

FIG. 2 schematically illustrates a basepoint estimator 16a that could be used in the multivariable control system 10 of FIG. 1. The basepoint estimator 16a is simplified in that it does not hold limits. The basepoint estimator 16a is operable to calculate a model prediction error 50 ("ŷ") in response to the feedback signal 28 and the model predictions 19. An estimator module 60 calculates the change in the estimated system state 42, a desired change in free basepoint values 64 ("Δb̂pf1"), and a desired change in basepoint values associated with variables having limits 64 ("Δŷcb1") in response to the error in model prediction 50. The desired changes 62, 64 are combined to form a desired change in basepoint values 66 ("x_bpe") vector.

Identity matrix 68a sets an actual change in basepoint values 70 ("x2") equal to the desired change in basepoint values 66. Identity matrix 68b sets goals 14 equal to reference values 44. The identity matrices 68a and 68b are used because FIG. 2 illustrates a simplified basepoint estimator 16. It is understood that identity matrices may not be able to be used in certain cases, such as when limits are active in the controlled system 32.

The actual change in basepoint values 70 is processed with a priori basepoint values 46a ("b̄pf") and 48a ("ȳcb") to estimate basepoint values 46 ("b̂pf") and 48 ("ŷcb"). Throughout this application, a line above a variable indicates an a priori estimate of that variable. For example, "x̄" would correspond to an a priori value of x. A processing step 72a ("z⁻¹") indicates that a value from a previous iteration, or a "last pass value", is used to produce a new value. One of ordinary skill in the art would understand how to perform such a processing step.

Figure 3:
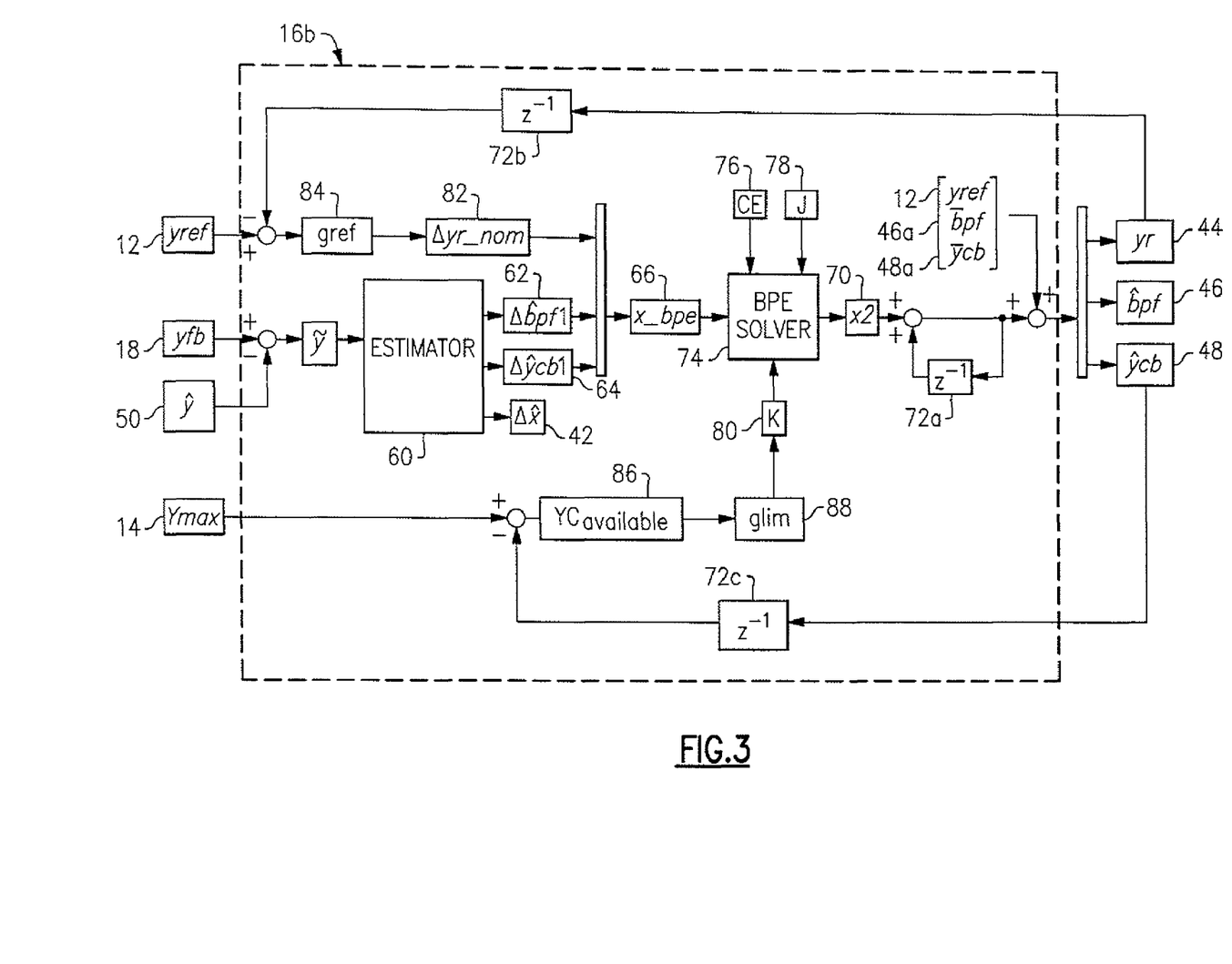
FIG. 3 schematically illustrates another basepoint estimator that could be used in the multivariable control system of FIG. 1.

FIG. 3 schematically illustrates a basepoint estimator 16b that is operable to handle active limits. A basepoint solver module 74 is used to calculate the actual change in basepoint values 70 ("x2") in response to the desired change in basepoint values 66, a mathematical model matrix 76 ("CE"), a mathematical model matrix 78 ("J"), and processed limits 80 ("K"). The matrices 76 and 78 may be calculated according to equations 3-10 shown below.

$$CE = \begin{bmatrix} I & 0 & 0 \\ CE1 & CE2 & CE3 \end{bmatrix} \quad \text{equation \#3}$$

$$CE1 \equiv \frac{\partial \hat{y}}{\partial yr} \quad \text{equation \#4}$$

$$CE2 \equiv \frac{\partial \hat{y}}{\partial bpf} \quad \text{equation \#5}$$

$$CE3 \equiv \frac{\partial \hat{y}}{\partial ycb} \quad \text{equation \#6}$$

$$J = [J1 \; J2 \; J3] \quad \text{equation \#7}$$

$$J1 \equiv \frac{\partial \hat{y}c}{\partial \hat{y}} \cdot CE1 \quad \text{equation \#8}$$

$$J2 \equiv \frac{\partial \hat{y}c}{\partial \hat{y}} \cdot CE2 \quad \text{equation \#9}$$

$$J3 \equiv \frac{\partial \hat{y}c}{\partial \hat{y}} \cdot CE3 \quad \text{equation \#10}$$

where ŷc corresponds to a portion of ŷ that has corresponding limited variables.

The basepoint estimator 16b is operable to calculate a difference between the goals 12 and a last pass value (see processing step 72b) of reference values 44 to determine nominal goal changes 82 ("Δyr_nom"). The nominal goal changes 82 are included in the desired change in basepoint values 66. A first gain matrix 84 ("gref") may be used to provide a smooth transition off a limit. For example, if a limit was active, and was then found to be inactive, the gain matrix 84 could provide a smooth transition off the limit so that the controlled system 32 does not experience an abrupt change.

The basepoint estimator 16b is also operable to calculate a difference between a plurality of limits 14 and a last pass value (see processing step 72c) of basepoint values 48 ("ŷcb") to determine a remaining data range until a limit is active 86 ("yc_{available}") Those of ordinary skill in the art could also replace ŷcb, the anticipated value of the limited variable at equilibrium, in signal 48 with ŷc, the prediction of the dynamically changing value of the limited variable from the mathematical model. A second gain matrix 88 ("glim") may be applied to the remaining data range 86 to produce processed limits 80 ("K"). The second gain matrix 88 can facilitate a smooth transition onto a limit, so that the controlled system 32 system may gradually reach a limit and not abruptly hit the limit.

In the example of FIG. 3, vector signal 70 ("x2") includes actual changes in perturbations to yr, bpf, and ycb. These perturbations are added to the a priori basepoint values 46a ("b̄pf") and 48a ("ȳcb") and to reference values 12 ("yref") to form updated values for internal reference vales yr 44, basepoint estimates 46 ("b̂pf"), and 48 ("ŷcb").

Figure 4:
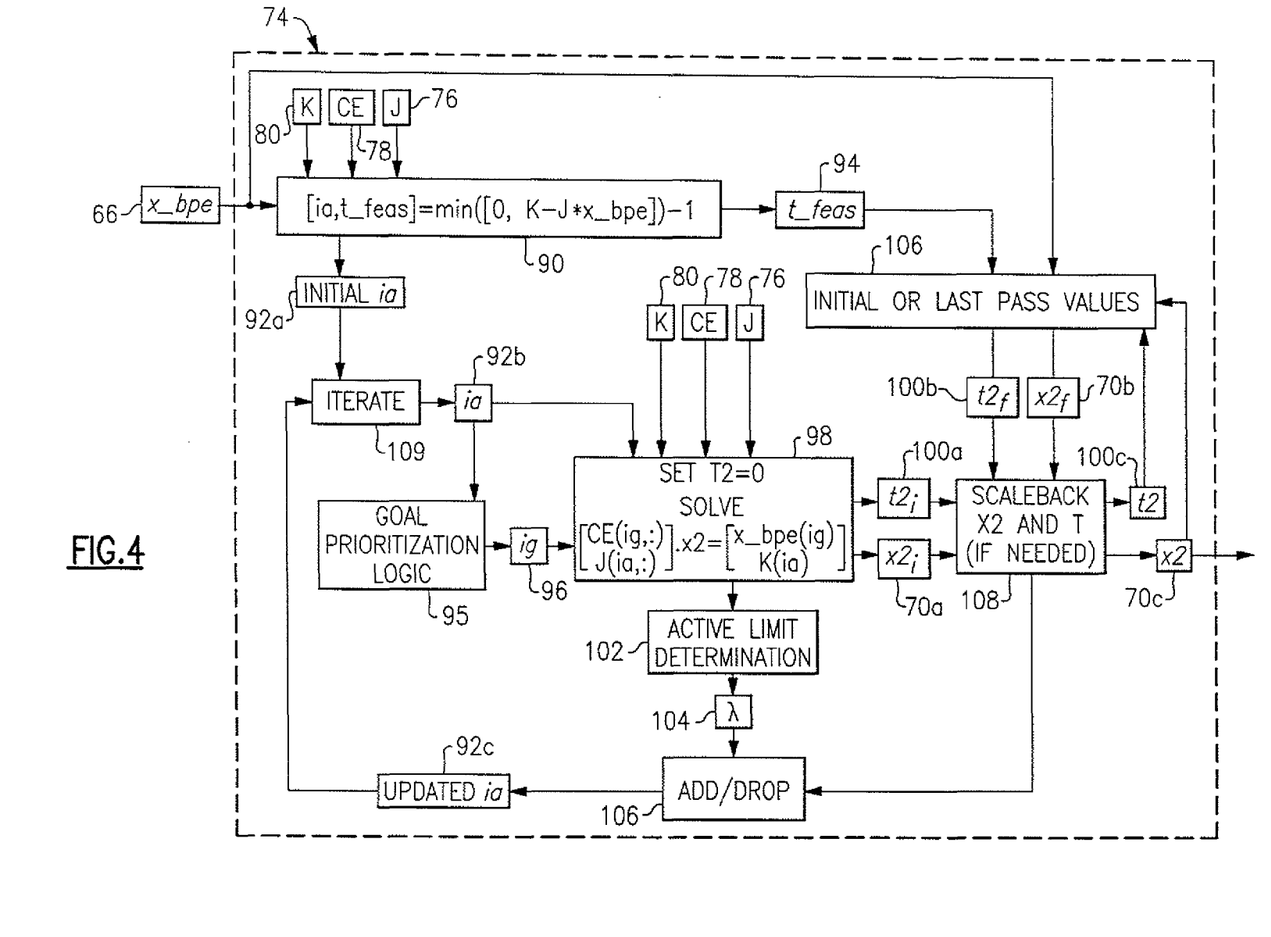
FIG. 4 schematically illustrates a basepoint solver module from the basepoint estimator of FIG. 3.

FIG. 4 schematically illustrates the basepoint solver 74 of FIG. 3 in greater detail. If a limit or a plurality of limits are active, the multivariable control system 10 may change the behavior of the controlled system 32 to avoid exceeding the active limits. To achieve this, the basepoint solver module 74 chooses the actual change in basepoint values 70 ("x2") to minimize a performance index ("PI"), represented by equation #11 below, subject to the constraints shown in equations #12-14 below. Equations #15-16 indicate a notation that may be used for the PI and the constraints.

$$PI = \frac{1}{2} \|(\Delta yr - \Delta yr\_nom)_{n+1}\|_Q^2 \quad \text{equation \#11}$$

where Q is a goal weighting matrix.

$$J \cdot x2 \leq K \equiv g\; lim \cdot (Y\max - \hat{y}cb_n) \quad \text{equation \#12}$$

$$\Delta yr\_nom = gref \cdot (yref - yr)_n + \Delta yref_{n+1} \quad \text{equation \#13}$$

$$[C1\; C2\; C3] \cdot x2 = [C1\; C2\; C3] \cdot x\_bpe \quad \text{equation \#14}$$

$$\|x\|_Q^2 = x^T Q \cdot x \quad \text{equation \#15}$$

$$\Delta( )_{n+1} \equiv ( )_{n+1} - ( )_n \quad \text{equation \#16}$$

The goal weighting matrix Q is a diagonal matrix, similar to an identity matrix, with diagonal entries of "1" corresponding to enabled goals, and diagonal entries of "0" corresponding to disabled, or relaxed, goals. The elements of Δyr_nom and Δyr are elements of the larger vectors x_bpe and x2, respectively.

The optimization problem of equation #11 can be related to basepoint estimator requirements by considering how the problem simplifies when gref=I and glim=I, where "I" is an identity matrix of dimensions determined by context. This may be only explanatory in that if the gain matrices 84 ("gref") and 88 ("glim") have these values, a change in reference values 44 ("yr") and free basepoint values 46 ("bpf") may be abrupt when limits switch between being active and inactive.

In this simplified case, the optimization problem of equation #11 may be minimized by #17, subject to the constraints of equations #18-20, as shown below.

$$PI = \frac{1}{2}\|(yref - yr)_{n+1}\|_Q^2 \qquad \text{equation #17}$$

$$\hat{y}cb_{n+1} \leq Ymax \qquad \text{equation #18}$$

$$\hat{y}cb_{n+1} = \hat{y}cb_n + J \cdot x2 \qquad \text{equation #19}$$

$$yr_{n+1} = yr_n + [I\ 0\ 0] \cdot x2 \qquad \text{equation #20}$$

This is explanatory in that equations #17-19 are a mathematical expression of the basepoint estimator 16 requirement of making the internal reference value 44 ("yr") as close to yref as possible (equation #17) while meeting a predetermined quantity of limits (equation #18). In one example, the predetermined quantity of limits corresponds to all received and enabled limits. This basepoint estimator design varies x2 to achieve this requirement, and equations #19-20 indicate how x2 variations affect the limits and goals, respectively.

Using values between "0" and "1" for the gain matrices 84, 88 allows a control system designer to relax this basepoint estimator 16 requirement of equations 19-20 for brief transients as limits change between being active and inactive. This enables the basepoint estimator 16 to be less sensitive to model errors, and to provide a smoother response.

Once an active set of limits 92 is known, the optimization problem (see equation #11) may be able to be solved by inspection. If the controlled system 32 is operating off limits, the constraints (see equation #12) can be ignored, and the solution becomes x2=x_bpe, which results in a PI of zero.

If a number of limits are active, the corresponding inequality constraints may become equality constraints, and a remainder can be neglected. Collecting indices of active limits in the active set 92, and disabling a quantity of goals equal to the quantity of active limits per an absolute goal prioritization scheme results in a solution (see equations #21-23 below) to the optimization problem of equation #9.

$$x2 = \begin{bmatrix} CE(ig,:) \\ J(ia,:) \end{bmatrix}^{-1} \begin{bmatrix} x\_bpe(ig) \\ K(ia) \end{bmatrix} \qquad \text{equation #21}$$

where ia corresponds to the indices of the active limits; and ig corresponds to the indices of the retained goals. The sum of ia+ig remains constant because a goal is dropped for each active limit.

$$CE(ig,:) = \begin{bmatrix} I(ig) & 0 & 0 \\ CE1 & CE2 & CE3 \end{bmatrix} \qquad \text{equation #22}$$

$$x\_bpe(ig) = \begin{bmatrix} \Delta yr\_nom(ig) \\ \Delta bpf2 \\ \Delta ycb2 \end{bmatrix} \qquad \text{equation #23}$$

If the active set 92 is known, using the equations #21-23 results in a performance index of zero, with a modified Q. However, because the active set 92 is not known, the active set 92 must be iteratively calculated (see FIG. 4). The optimization problem, as shown in equation #11, could be a quadratic programming problem if Q was constant, however because the value of Q varies depending on what limits are active the optimization problem may not be a quadratic programming problem, and the algorithm illustrated in FIG. 4 may be used instead.

Referring to FIG. 4, a first module 90 receives the desired change in basepoint values 66 ("x_bpe"), mathematical model matrices 76 ("CE") and 78 ("J") of sensitivity values, and processed limits 80 ("K"), and calculates an initial active set of limits 92a ("ia$_{initial}$") and a slack variable 94 ("t_feas") in response to those inputs according to equation #24 shown below (using the notation of the common Matlab® program).

$$[ia,t\_feas]=\min(0,K-[0\ 0\ 1]*x2\_bpe) \qquad \text{equation #24}$$

From the initial active set of limits 92a, a goal prioritization module 95 selectively determines which goals will be retained according to an absolute goal prioritization scheme. In the absolute goal prioritization scheme, a single goal is permitted to deviate from a corresponding desired goal value (or is "dropped") for each active limit in the active set 92. The goal prioritization module 95 outputs a set of retained goals 96 to a second module 98.

The second module 98 receives the retained goals 96, active limits 92b, processed limits 80, and matrices 76 ("CE") and 78 ("J") as inputs and calculates the actual change in basepoint values 70a ("x2$_i$") and an updated slack variable 100a ("t2$_i$") in response to the inputs, assuming the active limits 92b should be active. However, this assumption that the limits are active may not always be true.

The next steps are to determine if any presumed active limits should be dropped from the active set, and if any limits implicitly presumed to be inactive should be added. In an active limit step 102, the basepoint solver 74 determines if any active limits should be dropped from the active set 92. A ratio 104 ("λ(i)") of the change in PI to a change in a limited variable i is output from the active limit determination (step 102) to determine if any limits can be dropped (step 106), and an updated active set 92c ("ia") is prepared. The scale back operation 108 determines if a limit should be added to the active set, as limits may be exceeded if incorrectly omitted from the active set.

Values of actual change in basepoint values 70a ("x2$_i$") and the updated slack variable 100a ("t2$_i$") may be scaled back (step 108) if necessary to produce scaled back basepoint values 70c ("x2") and a scaled back slack variable 100c ("t2") to avoid exceeding limits that are not assumed to be active (i.e. not included in ia 92b). The scale back step 108 may use initial values of x_bpe and t_feas (for a first iteration), or may use last pass values of 100c ("t2") and 70c ("x2") for subsequent iterations, to form 100b ("t2$_f$") and 70b ("x2$_f$"). Basepoint value 70 may be scaled back toward t2$_f$ and x2$_f$ until all limits are satisfied. The most binding limit could then be added to the active set. The basepoint solver 74 is thus able to iterate (step 109) and iteratively solve for the active set 92b ("ia"). If no limits need to be added or dropped, the search for the active set is complete, and the value of x2 meets all limits and is output back to the greater basepoint estimator 16. A description of one example scale back operation can be found in "*Numerical Optimization*" by J. Nocedal and S. Wright (Springer-Verlag 1999).

Figure 5:
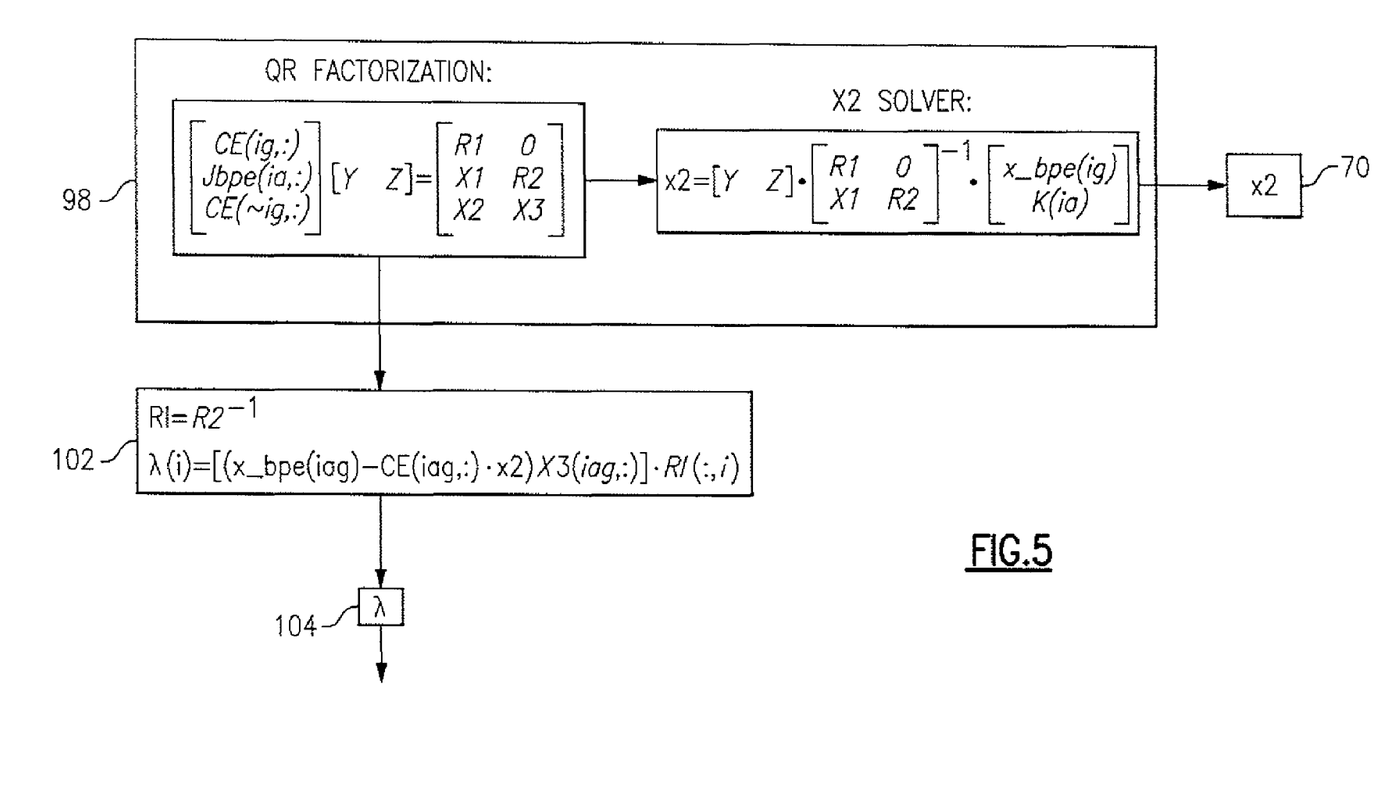
FIG. 5 schematically illustrates a more detailed description of modules 98 and 102 of the basepoint solver of FIG. 4.

FIG. 5 schematically illustrates an integrated method for implementing the second module 98 and the active limit determination 102. Equations #25-26 below correspond to the second solver module 98, and equations #27-28 correspond to the active limit determination 102.

$$\begin{bmatrix} CE(ig,:) \\ Jbpe(ia,:) \\ CE(\sim ig,:) \end{bmatrix} \cdot [Y \ Z] = \begin{bmatrix} R1 & 0 \\ X1 & R2 \\ X2 & X3 \end{bmatrix} \quad \text{equation \#25}$$

where R1 and R2 are lower triangular submatrices;
~ig indicates all goals are not included in ig; and
X1, X2, and X3 are full submatrices.

Equation #25 is known as a "QR factorization" in matrix algebra. The QR factorization can be used to both solve for x2 and to aid in the λ determination. The x2 solution is shown in equation #26 below.

$$x2 = [Y \ Z] \cdot \begin{bmatrix} R1 & 0 \\ X1 & R2 \end{bmatrix}^{-1} \cdot \begin{bmatrix} x\_bpe(ig) \\ Kbpe(ia) \end{bmatrix} \quad \text{equation \#26}$$

As shown in equation #26, the matrix to be inverted is lower triangular, and those skilled in matrix algebra would know how to use a forward substitution algorithm to avoid any matrix inversion. Determination of λ is then accomplished as shown in equations #27-28 below.

$$\lambda(i) = [(x\_bpe(iag) - CE(iag,:) \cdot x2) X3(iag,:)] \cdot RI(:,i) \quad \text{equation \#27}$$

$$R1 = R2^{-1} \quad \text{equation \#28}$$

where i corresponds to each active limit in turn; and
iag corresponds to a new goal added when a limit i is dropped.

The sign of each element of the ratio 104 ("λ") determines whether a corresponding active limit should be dropped from the active set 92. A negative element indicates that a small perturbation in the actual change in basepoint values 70 ("x2") exists that could move an associated active limit off the limit into a feasible region and may simultaneously make yr closer to yref.

The following is one example basepoint estimator application. One may partition y into two parts yg, for feedback signals to improve goal response, and yc to improve limit accuracy. One may then similarly partition yb into ygb and ycb. The basepoint estimator 16 may then be applied to a system with 6 states, 4 actuator signals, and 4 goal outputs and 30 limits. The set {xb,ub,ygb, ycb} will then include 44 values. Of the 6 states, 2 may be states of the controlled system 32 (or "plant states") and 4 may be actuator states. Of the 4 goal feedback signals, ygfb, 2 may be from sensors measuring plant variables, and 2 may be are simply basepoints of the two of the actuators. The latter two signals are from within the controller.

In this application, there are four reference values: two may be associated with two of plant feedback measurements and two may be associated with the two actuator basepoints included in yg. All 30 limits may have elements in feedback vector yc: 22 are from feedback sensors on the plant and 8 are from the actuator model implemented in the controller. Of the 30 limits, 4 may be maximums and minimums of the two plant state values, 8 may be maximums and minimums of the four actuator output values, and 18 may be otherwise. In this example application example there are 18 dependencies between the 44 basepoint values: 4 of xb that may be bases for actuator states are equal to the 4 actuator base values in ub, 2 in ygb that may be actuator bases equal to the 2 associated actuator bases in ub, 2 in ygb that may be state bases equal to the associated 2 state base values in xb, 4 elements in ycb may be plus and minus the bases for two plant states and may be equal to the associated values in±xb, and 8 in ycb may b e plus and minus bases for 4 actuators and may be equal to the associate±ub values.

The 18 dependencies reduce the 44 basepoints to 26 that are independent values to be estimated. These 26 may be grouped into ycb, bpf, and yr as the following: ycb may include bases for 18 of the limits that are other than states and actuators, yr may include 4 bases for 2 of the 4 plant variables measured by feedback sensors and 2 actuator base values, and bpf may include 4 bases including 2 plant states and the 2 actuator bases not included in yr.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method, comprising:
    receiving a plurality of goals, wherein each goal has a desired value;
    receiving a plurality of sensor feedback signals from a controlled system;
    receiving a plurality of predicted output values of the controlled system from a mathematical model;
    estimating on a microprocessor a desired change for a plurality of basepoint values in response to the goals, the feedback, and the predicted output values;
    calculating on the microprocessor an actual change in basepoint values in response to a plurality of limits, a retained set of goals, and the desired change for the plurality of basepoint values, the retained set of goals determined according to an absolute goal prioritization scheme;
    modifying the desired change as necessary to hold the limits;
    combining on the microprocessor the actual change in basepoint values with last pass values of the plurality of basepoint values to produce an updated basepoint estimate; and
    transmitting actuator requests to the controlled system in response to the updated basepoint estimate, wherein the actuator requests effect change in the controlled system.

2. The method of claim 1, wherein said step of calculating on the microprocessor an actual change in basepoint values includes:
    receiving the plurality of limits;
    receiving a plurality of matrices from the mathematical model;
    receiving a plurality of desired changes for the plurality of basepoint values;
    determining an active set of limits in response to the limits, the matrices, and the desired changes;
    determining a retained set of goals in response to the active set of limits; and
    calculating the actual change in basepoint values in response to the desired changes, the retained goals, the matrices, and the limits.

3. The method of claim 2, further comprising:
    determining if any active limits should be dropped from the active set;
    dropping a limit in response to a determination that the limit should be dropped;
    determining if any inactive limits should be added to the active set;
    adding a limit in response to a determination that the limit should be added; and selectively repeating at least one of the following steps:
- receiving the plurality of limits;
- receiving a plurality of matrices from the mathematical model;
- receiving a plurality of desired changes for the plurality of basepoint values;
- determining an active set of limits in response to the limits, the matrices, and the desired changes;
- determining a retained set of goals in response to the active set of limits; and
- calculating the actual change in basepoint values in response to the desired changes, the retained goals, the matrices, and the limits;
- determining if any active limits should be dropped from the active set;
- dropping a limit in response to a determination that the limit should be dropped;
- determining if any inactive limits should be added to the active set; and
- adding a limit in response to a determination that the limit should be added.

4. The method of claim 2, where said step of determining a retained set of goals in response to the active set of limits includes permitting a quantity of goals equal to the quantity of active limits to deviate from a desired value associated with each of the quantity of goals according to an absolute goal prioritization scheme.

5. The method of claim 1, wherein said step of calculating on the microprocessor an actual change in basepoint values maintains feedback dynamic properties of an estimator loop.

6. The method of claim 1, wherein said step of receiving a plurality of predicted output values includes:
- creating a first mathematical model to predict behavior of the controlled system; and
- mapping the actual change in basepoint values into a format that the mathematical model can process.

7. The method of claim 1, wherein the mathematical model is a quasi-linear parameter varying model.

8. The method of claim 1, wherein the mathematical model is a locally linearized model.

9. The method of claim 8, further comprising:
- using the parameter varying matrices from the mathematical model to maintain desirable dynamics throughout a controlled system operating envelope and across various permutations of active limits.

10. The method of claim 1, including using a first gain matrix to provide a smooth transition off of a limit.

11. The method of claim 1, including using a second gain matrix to provide a smooth transition onto a limit.

12. The method of claim 1, further comprising:
- creating actuator requests for a controlled system in response to the basepoint estimate.

* * * * *